United States Patent
Radtke, Jr.

(10) Patent No.: US 6,960,253 B2
(45) Date of Patent: Nov. 1, 2005

(54) METHOD OF FORMING HYDRAULIC CEMENT PROTECTIVE COATINGS

(75) Inventor: Clifford J. Radtke, Jr., Menasha, WI (US)

(73) Assignee: Kretekote, LLC, Kaukauna, WI (US)

( * ) Notice: Subject to any disclaimer, the term of this patent is extended or adjusted under 35 U.S.C. 154(b) by 86 days.

(21) Appl. No.: 10/697,377

(22) Filed: Oct. 30, 2003

(65) Prior Publication Data

US 2005/0092210 A1 May 5, 2005

(51) Int. Cl.$^7$ .............................. C04B 7/14; C04B 14/04
(52) U.S. Cl. ...................... 106/706; 106/692; 106/694; 106/695; 106/696; 106/705; 106/707; 106/708; 106/709
(58) Field of Search ................................ 106/692, 694, 106/695, 696, 705, 706, 707, 708, 709

(56) References Cited

U.S. PATENT DOCUMENTS

| | | | |
|---|---|---|---|
| 4,088,804 A | 5/1978 | Cornwell et al. | ............ 428/220 |
| 6,241,815 B1 * | 6/2001 | Bonen | ........................ 106/735 |
| 6,767,399 B2 * | 7/2004 | Peev et al. | .................. 106/808 |

OTHER PUBLICATIONS

Derwent Abstract No. 2004–792639, abstract of Russian Patent Specification No. 2237639 C2 (Oct. 2004).*

* cited by examiner

*Primary Examiner*—Anthony J. Green
(74) *Attorney, Agent, or Firm*—Donald J. Ersler

(57) ABSTRACT

Dry mixes for hydraulic cement coatings for masonry, above ground concrete structures and below ground concrete structures. Hydraulic cement, sand and particular aggregates are combined to form the dry mix, which is combined with a controlled quantity of a water base emulsion binder and water to form the hydraulic cement coating. The water base emulsion binder may be replaced with a redispersible polymer binder and a quantity of water.

16 Claims, No Drawings

METHOD OF FORMING HYDRAULIC CEMENT PROTECTIVE COATINGS

BACKGROUND OF THE INVENTION

1. Field of the Invention

The present invention relates generally to cement coatings and more specially to a method of forming hydraulic cement protective coatings.

2. Discussion of the Prior Art

Hydraulic cement based coatings are often used to repair masonry and concrete structures in both above and under ground applications. U.S. Pat. No. 4,088,804 to Cornwell et al. discloses cementitious coatings and method. The coatings are produced from hydraulic cement slurries formulated with finely divided mineral aggregates, a film-forming synthetic polymer latex, a water reducer and a rust inhibitor.

Accordingly, there is a clearly felt need in the art for a method of forming hydraulic cement protective coatings for masonry, above ground concrete structures and below ground concrete structures.

SUMMARY OF THE INVENTION

The present invention is particularly directed to providing an integrated composite of particular inorganic components added to a hydraulic cement, particularly, gray Portland cement and calcium aluminate cement, with particular aggregates, an emulsion and water to form the coating. The coatings of the present invention include application to masonry, such as brick walls; above ground concrete structures, such as bridges; and to underground concrete structures, such as manholes.

The hydraulic cements and the emulsions are well known and disclosed in the prior art, including the referenced U.S. Pat. No. 4,088,804. The coatings of this invention are therefore used to repair masonry and concrete structures. The coating creates a protective surface which prevents damage when the surface is subjected to weathering conditions, chemical condition, physical engagement and the like. The coating may function as a shield as well as provide additional structural integrity.

An effective inorganic coating must firmly bond to the substrate and preferably form a waterproof surface as well as a generally protective surface. The coating must in many instances prevent penetration of a surface from moisture, while allowing water vapor to pass through and from the coating.

The coatings may be applied for restoration of severely deteriorated masonry or concrete products. If the surface defect exposes rebars, mesh or the like, a proper coating may restore the function as well as appearance of the structure.

The present invention combines hydraulic cement and sand to form a mix which is combined with a controlled quantity of a synthetic emulsion and water to form a coating specially formulated for application to the masonry, a concrete surface or a concrete substrate.

The inorganic coatings of the present invention will provide weather protection in all climatic conditions. The coatings will protect above ground structures as well as below ground structures. The coatings further function to prevent excessive abrasion of the covered substrate surface.

The inorganic coatings are formed of materials, which further create a non-hazardous condition to the personnel preparing and applying the mixes and the final coating to the substrate. The coating also creates a non-contaminating atmosphere at the final product.

The coating is formed with fibers, which provide a particularly unique reinforcement of the coating and thereby create a strong, long-life coating on the substrate. The dry components are mixed with a synthetic emulsion and water, which function as a film former and water base binders. The emulsion and the water base hydraulic cement and sand with other active components form a stable coating which can be applied to a substrate by spraying, troweling and the like. Various emulsions of different combinations are well known and typical film forms emulsions are set forth in the description of the embodiments of the invention.

The application of these coatings are commonly sprayed with mechanical sprayers or troweled onto the selected substrates. One of the protective coatings is applied to underground concrete substrate, such as sewers. The other protective coating is applied to concrete substrate above ground, such as bridges.

The substrate to which these protective coatings are to be applied determine the selection of the composite mix and its mixing ratio to powder, emulsion and water. The coatings are applied to masonry, concrete structural members and concrete substrate to protect against weathering and harsh chemical conditions.

The dry mix of inorganic coatings within the scope of the present invention includes two combinations of the following elements or components. The following discloses specific components which are combined to produce the mixes for the two coatings. Each component is identified by the generic name of the product or by a well known trade name, with the basic chemical formula (if available) for each component set forth for fully disclosing the required and preferred components in each coating. The particular source for any component will be readily selected based on the chemical formula. The component name is used for ease and clarity of description herein.

The separate components and the functions thereof is as follows:

1. Gray Portland Cement Classified as type I.

2. Silica Sand $SiO_2$ functions as a major structure embodiment of the matrix, after the mix is sprayed or otherwise applied on the substrate and is cured.

3. Slag (iron ore, limestone and coke) A by-product from a blast-furnace used to make iron. These operate at a temperature of about 1500 degrees Celsius and are fed with carefully controlled mixture of iron-ore, coke and limestone. The iron ore is reduced to iron and the remaining materials form a slag that floats on top of the iron. This slag is periodically tapped off as a molten liquid and rapidly quenched in large volumes of water. The granulated slag is then dried and ground to a fine powder.

4. Sil-Co-Sil ($SiO_2$ or microcrystalline sand) A finely ground microcrystalline sand, is the main structural member next to silica sand in these dry mixes. The interaction with the hydraulic cements and other silicas, which are inert, assist in sealing the substrate from water penetration after the coating has cured.

5. Cab-O-Sil ($SiO_2$ or fumed silica). An additional thixotrope is hydrophobic fumed silica, which assists in water resistance, reduces spray on sagging and good anti-settling.

6. Zeothix (Si or silica powder) A fine, precipitated amorphous silica powder, which assists in water resistance, reduces spray on sagging and good anti-settling.

7. Fly ash $SiO_2Al_2O_3Fe_2O_3$ is a pozzolan, a silicate and a aluminous material. The presence of moisture will combine with the lime liberated during the hydration of cement, and produce a resistance to sulfate, a common deteriorating chemical to most coatings. Fly ash has a typical diameter of 25 microns.

8. Elkem (microsilica) A highly reactive pozzolan designed to increase concrete strength, reduce permeability and increase durability. Its optimal particle size distribution and spherical shape improves workability.

9. Mineral Wool $SiO_2$ CaO $Al_2O_3$ MgO $Fe_2O_3$. Inorganic synthetic "wool-like" fibers that absorb moisture.

10. Xypex C-1000 (silica sand cement) consists of portland cement, very fine treated silica sand and various active and proprietary chemicals. The active chemicals react with the moisture in fresh concrete and with the by-products of cement hydration to cause a catalytic reaction, which generates a non-soluble crystalline formation through the pores and capillary tracts of the concrete.

11. MetaMax is a high reactivity metakaolin. The metakaolin is a white mineral admixture with highly reactive pozzolanic properties.

12. Synthetic liquid emulsion is a carboxylated acrylic copolymer. The synthetic liquid emulsion is also referred to as a polymer film.

13. Elotex Titan 8100 is a redispersible polymer binder, which when combined with water may be substituted for the synthetic liquid emulsion.

14. Fondu is a Calcium Aluminate Cement $SiO_2Al_2O_3Fe_2O_3$. Fondu is a cement that has the characteristic of high breaking and compressive strength, resistance to high temperature, hygroscopicity and sulfuric acid.

15. Min-U-Sil (Si or natural crystalline silica) A high purity quality natural crystalline silica. The mineral is chemically inert and a high quality powder coating filler, which also offers superior resistance to corrosion, acid and heat.

16. Fly ash/Micron 3 $AiO_2$ $AlO_2$ $O_3$ $Fe_3O_2$ is a pozzolan, a silicate and an aluminous material. The presence of moisture will combine with the lime liberated during the hydration of cement, and produce a resistance to sulfate, a common deteriorating chemical to most coatings. Fly ash/Micron 3 has a mean diameter of 3 microns.

17. Ceramic Fiber ($Al_2O_3$ $SiO_2$ $Ca_2P_2O_5$ or aluminosilicate) A predominant unique component for structural performance are ceramic fibers. These are dispersed by hydrolysis. The ceramic fibers produce substantial improvement and provide reinforcement, reduce cracking, and allow more flexibility of the cured products. The fibers function well at elevated temperatures of 2300 F and are very resistant to chemical attack.

Although specific trade names or product names have been disclosed, the invention should not be limited to those products, but should include any product that may substituted for any of the previously recited component products.

After being dispersed by mixing and hydrolytic expansion, the structural position as expanded is maintained when the matrix is cured. All of the listed components perform as specified and function within the specified composite mix.

In addition to the structural bond of the hydraulic cement, either a film forming synthetic emulsion (carboxylated acrylic copolymer) or a redispersible polymer binder combined with water will be employed. The synthetic emulsion and the redispersible polymer combined with water may be characterized as binder solutions. Either of the above have a gainful effect for the coatings bonding to concrete or masonry.

The component materials, namely, hydraulic cement, silica sand and blended activating chemicals with binders and water, are used to formulate composites for protecting masonry and concrete. The mixes of the basic components is determined by above ground or below ground applications.

Accordingly, it is an object of the present invention to provide a hydraulic cement coating for protecting above ground concrete and masonry structures.

Finally, it is another object of the present invention to provide a hydraulic cement coating for protecting below ground concrete and masonry structures.

These and additional objects, advantages, features and benefits of the present invention will become apparent from the following specification.

DETAILED DESCRIPTION OF THE PREFERRED EMBODIMENTS

The following embodiments describe preferred components for application to concrete structures and masonry substrates. The formulated products form a waterproof layer by activation of the chemicals within the free lime and the capillary water in the concrete creating insoluble crystalline structures, which block the capillaries, and minor shrinkage cracks.

The following fiber reinforced coating sprayed onto concrete structures is very effective in restoration of severely deteriorated concrete. Areas that have spalled out to expose rebar and mesh can readily be restored for function, appearance and most importantly, provide future protection. The thickness of the coating applied is preferably at least one 1/16 of inch. The coating may be applied to fill deep cracks, voids and missing portions of a substrate.

| Composition mix for above ground Concrete or Masonry | |
|---|---|
| Component | Parts by weight |
| Gray Portland Cement | 100 |
| Silica Sand | 114–140 |
| Slag | 7–11 |
| Sil-Co-Sil | 28–46 |
| Cab-O-Sil | 2–5 |
| Zeothix | 4–8 |
| Fly Ash | 5–9 |
| Elkem | 9–12 |
| Mineral Fiber | 52–88 |
| Xypex C-1000 | 2–5 |
| MetaMax | 1–3 |

The above formulations describe various typical compositions, which can be modified in accordance with specific applications by those skilled in the art.

The portland cement is the primary structural binder of the composite powder mix when it is mixed with either a water base emulsion binder or a redispersible polymer binder and a quantity of water. The quantity of water base emulsion binder is 50–61 parts by weight. If the redispersible polymer binder is used, it is 10–14 parts by weight and mixed with water having between 44–54 parts by weight. The composite powder mix; and the water base emulsion binder or redisperisble polymer binder mixed with water are mixed with water having 88–112 parts by weight.

The mineral wool fibers absorb moisture contained in the coating to prevent future cracking of the cured coating. The mineral fibers support the coating and resist major change in thermal variations. It is preferable to use Micron 3 fly ash instead of regular fly ash. The smaller size of the Micron 3 fly ash allows voids to be filled to make the product denser and resist the infiltration of water, salt and other deicing chemicals.

The following ceramic fiber reinforced coating sprayed onto below ground concrete is very effective in restoration of severely deteriorated areas. Areas that have spalled out to expose rebar and mesh can readily be restored for function, appearance and most importantly, provide future protection. The thickness of the coating applied is preferably at least one 1/16 of inch. The coating may be applied to fill deep cracks, voids and missing portions of a substrate.

Composition mix for below ground Concrete

| Component | Parts by weight |
| --- | --- |
| Calcium Aluminate Cement | 100 |
| Flint Silica Sand | 95–117 |
| Sil-Co-Sil | 24–44 |
| Min-U-Sil | 9–13 |
| Cab-O-Sil | 2–4 |
| Zeothix | 4–6 |
| Fly Ash | 1–3 |
| MetaMax | 3–7 |
| Elkem | 5–9 |
| Ceramic Fiber | 9–13 |
| Xypex C-1000 | 2–4 |

The above formulations describe various typical compositions which can be modified in accordance with specific applications by those skilled in the art.

The calcium aluminate cement is the primary structural binder of the composite powder mix when it is mixed with either a water base emulsion binder or a redispersible polymer binder and a quantity of water. The quantity of water base emulsion binder is 39–47 parts by weight. If the redispersible polymer binder is used, it is 7.8–11.4 parts by weight and mixed with between 34–42 parts by weight of water. The composite powder mix; and the water base emulsion binder or redisperisble polymer binder mixed with water are mixed with 64–88 parts by weight of water.

The ceramic fibers are impact resistant, sulfuric acid resistant, support the coating and resist major change in thermal variations. It is preferable to use Micron 3 fly ash instead of regular fly ash. The smaller size of the Micron 3 fly ash allows voids to be filled to make the product denser and resist the infiltration of water, salt and other deicing chemicals.

All of the reviewed information on components mix combinations and their related functions are for coatings that are used for weather protection in all climatic conditions; for protection of structures; installations in extreme atmospheres in processing plants; and for protection to the substrate in excessive abrasion conditions.

All the inorganic components are mixed and function in their applications to establish a non-hazardous condition in preparation and are non-contaminating to the atmosphere and applicators.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A hydraulic cement coating composition for application to above ground structures comprising:
    a dry mix including in parts by weight of hydraulic cement 100, silica sand 114–140, slag 7–11, microcrystalline sand 28–46, fumed silica 2–5, silica powder 4–8, fly ash 5–9, microsilica 9–12, mineral fiber 52–88, silica sand cement 2–5 and a high reactivity metakaolin 1–3, wherein the parts by weight is based upon a total amount of the dry mix;
    a binder solution; and
    a quantity of water, said dry mix and said binder solution being combined with said quantity of water.

2. The hydraulic cement coating composition for application to above ground structures of claim 1, wherein:
    said hydraulic cement is and being a type I hydraulic cement.

3. The hydraulic cement coating composition for application to above ground structures of claim 1, wherein:
    said binder solution being a carboxylated acrylic copolymer, said quantity of said binder solution being 5–61 parts by weight, wherein the parts by weight is based upon the total composition.

4. The hydraulic cement coating composition for application to above ground structures of claim 1, wherein:
    said binder solution being a redispersible polymer binder, 10–14 parts by weight of said redispersible polymer binder being combined with between 44–54 parts by weight of water, wherein the parts by weight is based upon the total composition.

5. The hydraulic of water cement coating composition for application to above ground structures of claim 1, wherein:
    said quantity of water being 88–112 parts by weight, wherein the parts by weight is based upon the total composition.

6. The hydraulic cement coating composition for application to above ground structures of claim 1, wherein:
    said fly ash having a mean diameter of 3 microns.

7. A hydraulic cement coating composition for application to below ground structures comprising:
    a dry mix including in parts by weight of hydraulic cement 100, flint silica sand 95–117, microcrystalline sand 24–44, natural crystalline silica 9–13, fumed silica 2–4, silica powder 4–6, fly ash 1–3, a high reactivity metakaolin 3–7, microsilica 5–9, ceramic fiber 9–13 and silica sand cement 2–4, wherein said parts by weight are based upon a total amount of said dry mix;
    binder solution; and
    quantity of water, said dry mix and said binder solution being combined with said quantity of water.

8. The hydraulic cement coating composition for application to below ground structures of claim 7, wherein:
    said hydraulic cement having a chemical formula of $Al_2O_3$ $CaO$ $SiO_2$ $Fe_2O_3$ $Na_2O$.

9. The hydraulic cement coating composition for application to below ground structures of claim 7, wherein:
    said binder solution being a carboxylated acrylic copolymer, said quantity of binder solution being 39–47 parts by weight, wherein the parts by weight is based upon the total composition.

10. The hydraulic cement coating composition for application to below ground structures of claim 7, wherein:
    said binder solution being a redispersible polymer binder, 7.8–11.4 parts by weight of said redispersible polymer binder being combined with between 34–42 parts by weight of water, wherein the parts by weight is based upon the total composition.

11. The hydraulic cement coating composition for application to below ground structures of claim 7, wherein:
said quantity of water being 64–88 parts by weight, wherein the parts by weight is based upon the total composition.

12. The hydraulic cement coating composition for application to below ground structures of claim 7, wherein:
said fly ash having a mean diameter of 3 microns.

13. A hydraulic cement coating composition for application to above ground structures comprising:
a dry mix including in parts by weight a type I hydraulic cement 100, silica sand 114–140, slag 7–11, microcrystalline sand 28–46, fumed silica 2–5, silica powder 4–8, fly ash 5–9, microsilica 9–12, mineral fiber 52–88, silica sand cement 2–5 and a high reactivity metakaolin 1–3, wherein said parts by weight are based upon a total amount of said dry mix;
a binder solution; and
a quantity of water being between 88–112 parts by weight, said dry mix and said binder solution being combined with said quantity of water.

14. The hydraulic cement coating composition for application to above ground structures of claim 13, wherein:
said binder solution being a carboxylated acrylic copolymer, said quantity of said binder solution being 50–61 parts by weight, wherein the parts by weight is based upon the total composition.

15. The hydraulic cement coating composition for application to above ground structures of claim 13, wherein:
said binder solution being a redispersible polymer binder, 10–14 parts by weight of said redispersible polymer binder being combined with between 44–54 parts by weight of water, wherein the parts by weight is based upon the total composition.

16. The hydraulic cement coating composition for application to above ground structures of claim 13, wherein:
said fly ash having a mean diameter of 3 microns.

* * * * *